US008915773B2

(12) United States Patent
Nielsen (10) Patent No.: US 8,915,773 B2
(45) Date of Patent: Dec. 23, 2014

(54) SEPARATION OF THE SPINAL COLUMN FROM A CARCASS MIDDLE PART (75) Inventor: Erik Vind Nielsen, Esbjerg (DK)

(73) Assignee: Humboldt B.V., Lichtenvoorde (NL)

( * ) Notice: Subject to any disclaimer, the term of this patent is extended or adjusted under 35 U.S.C. 154(b) by 149 days.

(21) Appl. No.: 13/696,791

(22) PCT Filed: May 9, 2011

(86) PCT No.: PCT/EP2011/057391
§ 371 (c)(1),
(2), (4) Date: Nov. 7, 2012

(87) PCT Pub. No.: WO2011/138461
PCT Pub. Date: Nov. 10, 2011

(65) Prior Publication Data
US 2013/0059513 A1 Mar. 7, 2013

(30) Foreign Application Priority Data
May 7, 2010 (DK) .......................... PA 2010 70192

(51) Int. Cl.
A22C 18/00 (2006.01)
A22C 17/00 (2006.01)
A22B 5/00 (2006.01)

(52) U.S. Cl.
CPC ............. A22C 17/004 (2013.01); A22B 5/0041 (2013.01); A22C 17/0086 (2013.01)
USPC ........................................................ 452/150

(58) Field of Classification Search
USPC .................. 452/149–153, 155–157
See application file for complete search history.

(56) References Cited

U.S. PATENT DOCUMENTS

| 5,295,896 | A  | * | 3/1994  | Petersen          | 452/135 |
| 7,473,166 | B2 | * | 1/2009  | Sbarro            | 452/135 |
| 7,635,294 | B2 | * | 12/2009 | Tomcak et al.     | 452/135 |
| 7,892,076 | B2 | * | 2/2011  | Mirtsching et al. | 452/141 |
| 8,485,871 | B2 | * | 7/2013  | Bolte et al.      | 452/140 |

FOREIGN PATENT DOCUMENTS

| EP | 0 714 607 A1    | 6/1996  |
| EP | 0 743 618 A2    | 11/1996 |
| EP | 0 985 348 A2    | 9/1999  |
| EP | 1 736 057 A1    | 12/2006 |
| WO | WO 02/30208 A1  | 4/2002  |
| WO | WO 03/032739 A1 | 4/2003  |
| WO | WO 2007/041590 A1 | 4/2007 |

* cited by examiner

Primary Examiner — Richard Price, Jr.
(74) Attorney, Agent, or Firm — Bret E. Field; Bozicevic, Field & Francis LLP (57) ABSTRACT A method and a system for separating the spinal column from a carcass middle part, comprising the steps of providing a digital representation of an outer surface of the carcass middle on the basis of, e.g., an optical scan, determining a cutting path (1c) for a cutting device for the separation of the spinal column from the carcass middle on the basis of digital processing of the scan, and subsequently separating the spinal column from the carcass middle by causing a relative movement between the middle and the cutting device and simultaneously causing the cutting device to engage the carcass middle, wherein the relative movement between the middle and the cutting device during the spinal column separation to achieve a cut along the predetermined cutting path (1c).

13 Claims, 5 Drawing Sheets

SEPARATION OF THE SPINAL COLUMN FROM A CARCASS MIDDLE PART

TECHNICAL FIELD

The present invention relates to a method and a system for separating the spinal cord from a middle of a carcass, such as a pork carcass, notably a left or right half-carcass. The invention may for example provide a rib-top cut and/or a spinal cord cut.

BACKGROUND OF THE INVENTION

In recent years, much effort has been put into the development of automated systems and methods for meat processing in slaughterhouses. EP 985 348 discloses a method and apparatus for longitudinal cutting of the middles of half carcasses. The apparatus comprises a circular saw for effecting a rib-top cut, the circular saw being displaceable in a longitudinal direction above a conveyor, which supports the middle. Another system for cutting middles is known from WO 03/032739, which discloses wedge-shaped conveyor elements and a hook for seizing and holding a middle by the spinal column. An inductive sensor is provided for measuring horizontal positions of an inner surface of the middle at a pre-determined distance below the conveyor. The positions of a cutting device for cutting the middle are adjusted as a function of control signals, which are derived from the measured horizontal positions.

It has been found that the rib-top cuts or spinal cord cuts known from the prior art suffer from the shortcoming that relatively large amounts of meat are being cut off together with the spinal column due to lack of precision in the positioning of the cutting devices for. Generally, the variation of the exact dimensions of middles complicates automated cutting. It must, for example, be avoided that the cutting devices unintentionally engage the spinal column itself, as this could result in the presence of bone fragments in the meat, which would complicate further processing thereof and be unacceptable to consumers. Further, a risk exists that the commercially valuable meat to be processed further and sold is physically damaged due to improper positioning of the cutting device, and damage may even occur to the cutting device itself. Therefore, the cut for the separation of the spinal column is typically placed with a certain safety distance into the meat, which on the one hand minimizes the risk of unintentional cutting into the spinal cord and/or into commercially valuable meat, but which on the other hand results in a relatively high degree of waste, because meat, which could have been sold if left on the middle, is being cut off and discarded together with the spinal column.

Another drawback of commercially available systems for the automated separation of spinal columns from middles of half-carcasses is that separate machines are needed for right and automated systems even less competitive to manual cutting.

The amounts of waste may be reduced in a manual cutting process/in which an operator manually controls the position of a circular saw relative to the half-middle. Even though such a process is labour intensive and hence costly/it is still today the preferred procedure in many slaughterhouses due to the above-mentioned disadvantages of automated systems and due to the low initial investment in cutting equipment.

EP-A-1 736 057 discloses a spine removing method and device/in which a CCD camera captures the position and shape of the spinal column in a block of meat. On the basis of the captured image/a six-axis jointed-arm robot is controlled to position a round-edge body at a certain position and tilt angle. The round-edge body performs two cuts in a V-letter form. It has been found that the V-letter configuration of the cut achieved by the method and device of EP-A-1 736 057 renders the system rather complex and inefficient. Additionally/there exists a further need for minimizing the amount of waste/despite the improvement achieved by the automated system of EP-A-1 736 057.

DESCRIPTION OF THE INVENTION

It may be an object of embodiments of the present invention to provide a method and a system for the automated separation of the spinal column from a carcass middle/which minimizes the amounts of waste by providing a precise positioning of the cutting device. It may be another object of embodiments of the invention to provide a method and system/which is less complex and more affordable that the prior art systems. It may be another object of embodiments of the invention to provide a system/which eliminates the need for separate machinery for the cutting of left and right half-carcasses.

In a first aspect/the invention provides a method of separating the spinal column from a carcass middle part/comprising the steps of:
  determining a cutting path (1c) for a cutting device for the separation of the spinal column from the carcass middle;
  separating the spinal column from the carcass middle part by causing a relative movement between the middle and the cutting device and simultaneously causing the cutting device to engage the carcass middle; characterized by:
  optically scanning the carcass middle part to provide a scan of an outer surface of the carcass middle;
  identifying the vertebral canal of the spinal column in the scan on the basis of digital processing thereof;
  determining the relative position of the cutting path (1c) with respect to the carcass middle part on the basis of the position of the vertebral canal in said scan; and and
  controlling the relative movement between the middle part and the cutting device during the spinal column separation to achieve a cut along the predetermined cutting path (1c), wherein at least the steps of optically scanning and identifying the vertebral canal occur prior to the step of causing the cutting device to engage the carcass middle.

In all aspects of the present invention, the carcass middle may be supported by a conveyor during separation of the spinal column there from, and the conveyor may longitudinally convey the carcass middle past the cutting device during separation of the spinal column. Hence, the cutting device may be at longitudinal standstill.

In a second aspect, the invention provides a system for separating the spinal column from a carcass middle, comprising:
  a cutting device;
  a control system for determining a cutting path (1c) for the cutting device for the separation of the spinal column from the carcass middle;
  a motion system for causing a relative movement between the middle and the cutting device while the cutting device to engage the carcass middle; characterized by:
  an optical image scanner and/or camera for providing a scan of an outer surface of the carcass middle;
  a control system for determining, on the basis of digital processing of said scan, a cutting path (1c) for the cutting device for the separation of the spinal column.

In a further independent aspect, the invention provides a method of separating the spinal column from a carcass middle part, comprising the steps of:

determining a cutting path (1c) for a cutting device for the separation of the spinal column from the carcass middle part;

separating the spinal column from the carcass middle by causing a relative movement between the middle part and the cutting device and simultaneously causing the cutting device to engage the carcass middle part;

characterized by:

optically scanning the middle part to provide a three-dimensional scan of an outer surface of the carcass middle part, wherein the step of optically scanning occurs prior to the step of determining the cutting path (1c);

determining the cutting path (1c) for separation of the spinal column from the middle on the basis of digital processing of the three-dimensional scan prior to causing the cutting device to engage the carcass middle; and     controlling the relative movement between the middle and the cutting device during the spinal column separation to achieve a cut along the predetermined cutting path (1c)'

It will hence be appreciated that in a most general aspect! the present invention provides a method and a system for separating the spinal column from a carcass middle part; comprising the steps of:

providing a digital representation of an outer surface of the carcass middle on the basis of! e.g., an optical scan;

determining a cutting path (1c) for a cutting device for the separation of the spinal column from the carcass middle on the basis of digital processing of the scan; and subsequently:

separating the spinal column from the carcass middle by causing a relative movement between the middle and the cutting device and simultaneously causing the cutting device to engage the carcass middle! wherein the relative movement between the middle and the cutting device during the spinal column separation to achieve a cut along the predetermined cutting path (1c).

Generally, the present invention relies on the identification of certain parts of the carcass middle prior to the separation of the spinal column there from. For example, the path of the spinal column is detectable in an optical scan. In particular, the vertebral canal and/or the spinal column may be identified. Accordingly a path for the cutting device may be determined on the basis of the path of the spinal column itself. Three-dimensional contours and shapes of the middle part may further be derived on the basis of a three-dimensional scan obtained e.g. by one or more digital cameras, thereby allowing for control of not only the position of the cutting device! but also of its orientation, i.e. at least one of pitch, yaw and inclination angle. It has been found that the vertebral canal may be more easily identifiable in optical scans, such as digital images, than the spinal column itself. Moreover, in embodiments of the invention, the identification of the vertebral canal in the optical scan rather than the spinal column has shown to result in a more accurate cut with minimized waste.

It will hence be appreciated that the cutting path can be optimized on the basis of the control system's knowledge of the position and path of the spinal column and/or the vertebral canal. Accordingly, waste can be minimized, and the exact position and orientation of the cut can be controlled along the entire length of the carcass middle part. Further! processing of the scan renders it possible to detect if the carcass middle part is a right or left half, and the cutting device may in turn be controlled on the basis of this information to process the carcass middle part accordingly. Hence, there is no need for separate equipment to process left and right carcass halves. Moreover, as the surface shape of the carcass half is detected in a three-dimensional scan, the cutting device may be controlled to avoid undesired cutting into meat and/or bone. It will be understood that the cutting path (1c) may be non-linear in most instances when seen along a longitudinal view.

The carcass middle may be supported by a supporting surface, such as a conveyor, e.g. a conveyor belt, during separation of the spinal column there from, preferably with a rind side of the carcass middle part facing the support surface. At least a portion of the carcass middle may be allowed to move relative to the supporting surface, while the cutting device engages it to separate the spinal column there from. Accordingly, deflections of the carcass middle part may be allowed, while the spinal column separation takes place. It has been found that such defections minimize the risk of damage to the cutting device, as the cutting device is not forced to flex or to counteract firm supports acting on the carcass middle. In preferred embodiments, the spinal column separation is carried out without any straightening of the carcass middle part and without any fixation thereof other than fixation in a longitudinal direction, which is required in order to counteract the cutting force conferred by the cutting device. For example, a conveyor for the middle may be provided with spikes or other protrusions, or means of increased surface friction for providing the necessary stability of the middle relative to the conveyor.

In preferred embodiments of the invention, the spinal column is separated from the carcass middle part by one single cut, achieved e.g. by a single circular saw. Accordingly, a plurality of cuts is avoided, and significantly more carcass units may be processed per unit time. In embodiments of the invention, in which the position and inclination angle of the cutting device are variable along the cutting path, a possible increase of waste caused by the performance of a single cut only is compensated by variable position and inclination angle of the cutting device.

In one embodiment of the invention, the cutting path is determined to cut the spinal column such that the ribs are exposed in order to facilitate subsequent deboning. Alternatively, the cutting path may be determined such that the cut only removes the vertebral canal.

In preferred embodiments of the present invention, the cutting device may be a circular saw. However, other types of cutting devices may be employed, such as reciprocating knives or saws.

The cutting device may be positionable to separate the spinal column from left and right carcass middles to avoid the need for separate machinery for left and right parts, and to avoid the need for sorting equipment upstream of the cutting device. Accordingly, the methods of the present invention may comprise the steps of:

digitally processing the scan to determine if the carcass middle part is a left or a right half carcass prior to separating the spinal column there from, and     passing a control signal for the control of the cutting device, on the basis of which the cutting device is positioned relative to the carcass part to take into account if it is a left or right half carcass.

Embodiments of the invention will now be further described with reference to the accompanying figures, in which.

Figure 1:
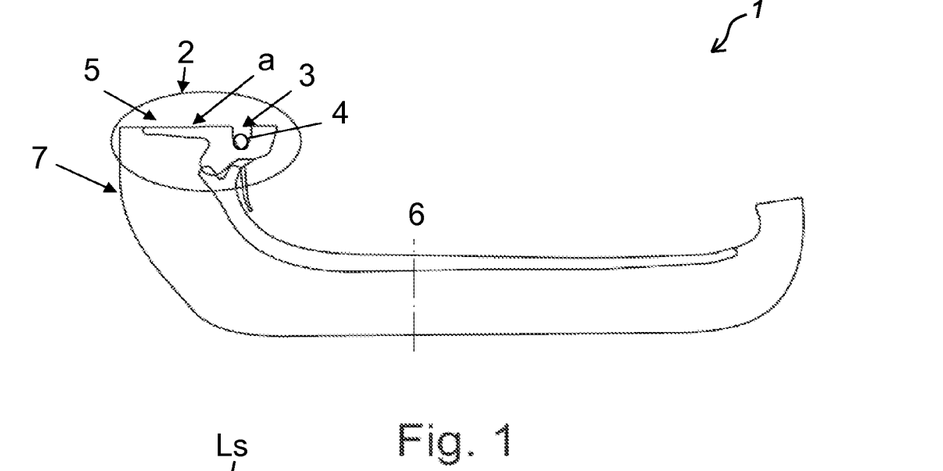
FIGS. 1-3 show transverse cross sections of a middle of a half pork carcass.
Figure 2:
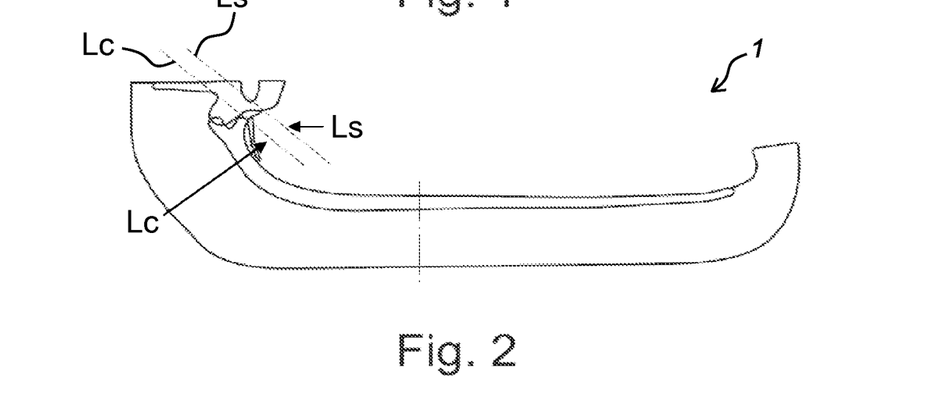
Figure 3:
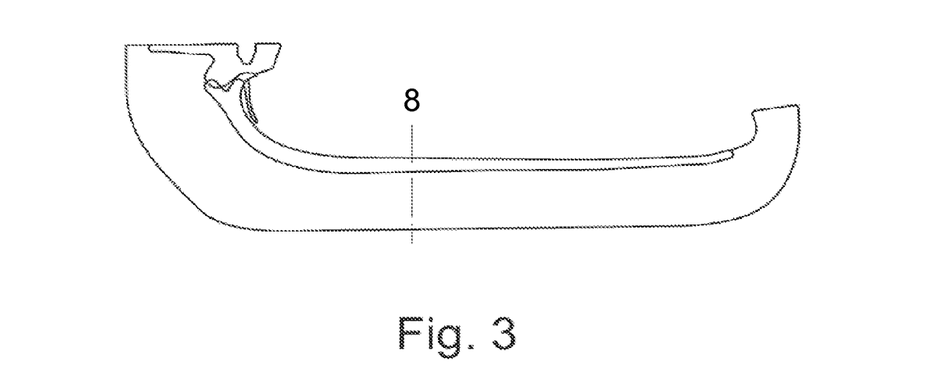

FIGS. 1-3 are illustrations of a transverse cross section through a middle (1) of a half pork carcass. As shown in FIG. 1, the middle (1) comprises a rib top (2) including the vertebral canal (3) and the spinal cord (4) (herein the spinal cord is also referred to as the spinal column (4)). The feather bone (5) extends transversely from the vertebral canal (3) along the spinal column surface (a). FIGS. 1-3 further show the back line (7) and the rib (6). FIG. 2 shows two possible cuts (1*c*) and (1*s*) for the separation of the spinal column from the middle (1), a rip-top cut (1*c*) and a spinal cord cut (1*s*). Both types of cut can be accomplished by the methods according to the present invention. FIG. 3 shows a middle cut (8), which may be carried out immediately prior to or immediately subsequent to the separation of the spinal column (4) from the middle (1).

Figure 4:
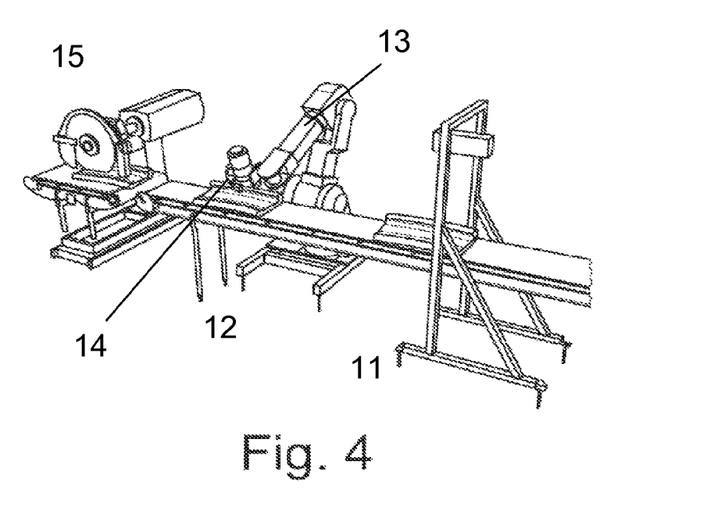
FIG. 4 illustrates a process line incorporating a system according to the present invention for separation of the spinal column from a middle of a half carcass.

As generally shown in FIG. 4, in one embodiment of the invention, the middle (1) may be conveyed past a camera unit (11) for obtaining the scan of the outer surface of the middle (1).

Subsequently, the middle (1) (or middle part) is conveyed further past the rip-top cutting unit (12), which separates the spinal column (4) from the middle (1) in accordance with the present invention. The control of the robot (13) which holds a circular saw or other appropriate cutting device (14) is carried out by a computer (not shown) on the basis of digital processing of the scan obtained by the camera. After the middle (1) has passed the rip-top cutting unit (12), the middle (1) is conveyed past a middle saw (15) for effecting the middle cut (8) illustrated in FIG. 3.

Figure 5:
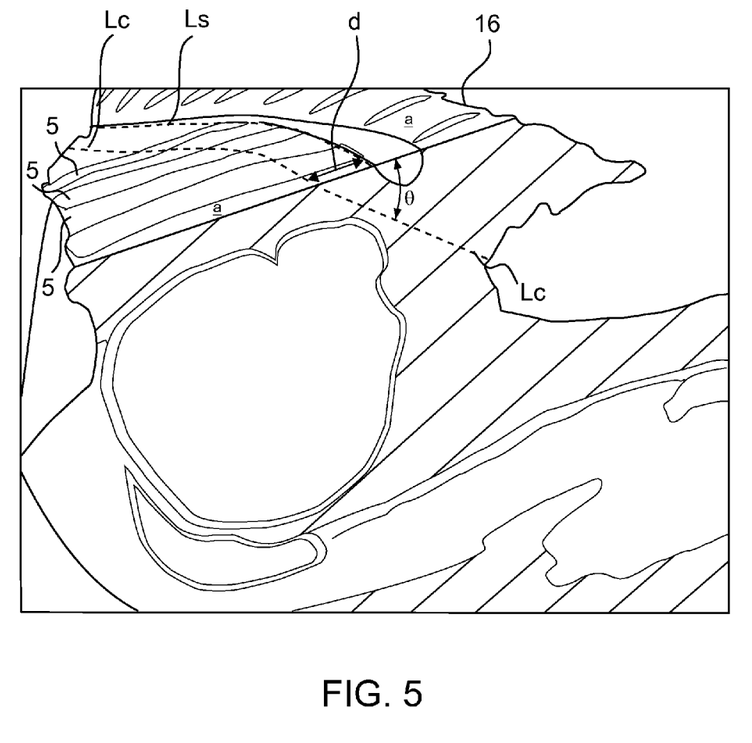
FIG. 5 is an image of a middle of a half pork carcass, illustrating a spinal column path, cutting path, spinal column surface and inclination angle of a future spinal column cut.

The digital processing of the scan may comprise the steps of determining coordinates of the spinal column (4) to identify a spinal path (1*s*), cf. FIG. 5, at a plurality of distinct transverse cross sections along the length of the carcass middle (1). The step of determining the cutting path (1*c*) for the cutting device may comprise the steps of determining, at a plurality of distinct transverse cross sections along the length of the carcass middle (1):

a transverse distance (d) between the spinal path (1*s*) and the cutting path (1*c*) on the spinal column surface (a) of the carcass middle, an inclination angle (θ) between the spinal column surface (a) and the cutting device (14) in a cross sectional plane, which is essentially perpendicular to the cutting path (1*c*) and/or to the spinal column (4); hence, the cutting device (14) may rotatable around a longitudinal axis, i.e. an axis, which is essentially parallel to the spinal column (4).

The position and orientation of the cutting device (14) may accordingly be controlled while the cutting device (14) engages the carcass middle (1), so as to position and orient the cutting device (14) to separate the spinal column (4) from the carcass middle (1) along the desired cutting path (1*c*) at the desired inclination angle (A).

It should be understood that the inclination angle (A) may be determined with reference the spinal column plan (a) or with reference to any other surface, such as the surface of a conveyor supporting the carcass middle part.

A pitch angle of the cutting device (14) may further be controlled while it engages the carcass middle (1). In the present context, the pitch angle denominates that angle, which is defined between the cutting device (14) and the spinal column surface (a) in a longitudinally extending plane, which is essentially parallel to the spinal column (4), i.e. rotation around a transverse axis, i.e. an axis, which is essentially perpendicular to the spinal column (4).

In embodiments of the invention, in which the cutting device (14) comprises a circular saw, the pitch angle is preferably controlled to avoid that a rearward facing edge of the circular saw engages the carcass middle, while a forward facing edge of the circular saw engages the carcass middle (1) to separate the spinal column (4) there from. Hence, non-desirable cuts of the rearward-facing edge of the saw into meat, from which the spinal column has already been separated, is avoided, as discussed further below with reference to FIG. 8. This improves meat quality and reduces wear on the saw.

The motion control of the cutting device (14) relative to the carcass middle (1) or relative to a conveyor supporting the carcass middle (1) preferably comprises six degrees of freedom, i.e.:

the position (x,y,z) of a centre of the cutting device (14) at each of a plurality of distinct positions along the length of the carcass middle (1); the position (x,y,z) may for example be a position relative to a reference point on the carcass middle (1) or relative to a point on a conveyor or a fixed reference point;

the inclination angle (A) of the cutting device at each of said plurality of distinct positions;

the pitch angle of the cutting device (14) at each of said plurality of distinct positions; and a yaw angle of the cutting device (14), i.e. an angular position of the cutting device (14) with respect to an upright axis, at each of said plurality of distinct positions.

Generally, the spatial position and/or the orientation of the cutting device (14) relative to the carcass part may be variable along the cutting path (1*c*). In other words, the position of the cutting device may be variable along at least one axis in addition to the axis along which the carcass part moves. In addition, or alternatively, the orientation, i.e. rotation of the cutting device (14) may be variable around at least one axis relative to the carcass part during cutting.

The spinal column (4) and/or the vertebral canal (3) may be identified in the scan by digital processing of a difference image, in which the rib-facing edge (16) of the spinal column (4) section of the carcass middle (1) and/or the spinal column (4) is detected on the basis of a height difference.

The carcass middle (1) may be supported by a conveyor during separation of the spinal column (4) there from, and the conveyor may longitudinally convey the carcass middle (1) past the cutting device (14) during separation of the spinal column (4). Hence, the cutting device (14) may be at longitudinal standstill.

Referring to FIG. 5, to determine the cut (1*c*), the angle of the spinal column surface (a) with respect to the conveyor plane is determined. As the surface (a) is twisted along the cutting curve (1*c*), this angle is found at a number of positions along the middle. Next, the spine path (1*s*) is found along the middle. The cutting path (1*c*) is subsequently calculated. The inclination angle (A) and the distance (d) between the cutting path (1*c*) and the spinal column path (1*s*) vary along the cutting curve. The variation of the inclination angle (A) and of distance (d) depends on whether the middle (1) is a middle of a left or right half carcass, the size of the middle (1) and on user settings.

The robot (13) controlling the cutting device (14) has six degrees of freedom. Accordingly, each coordinate has 6 parts: control the position of the robot (13) in three dimensions (x,y,z), as well as the inclination, pitch and yaw angles of the cutting device (14). The cutting path (1c) is provided as a list of n discrete sets of coordinates arranged equidistantly along the middle (1). The system also has the ability to determine ribs (6) and measure a length from the first to last rib. The rib information and information about the twisting of the surface (a) are used to distinguish between left and right halves of middles (1).

Figure 6:
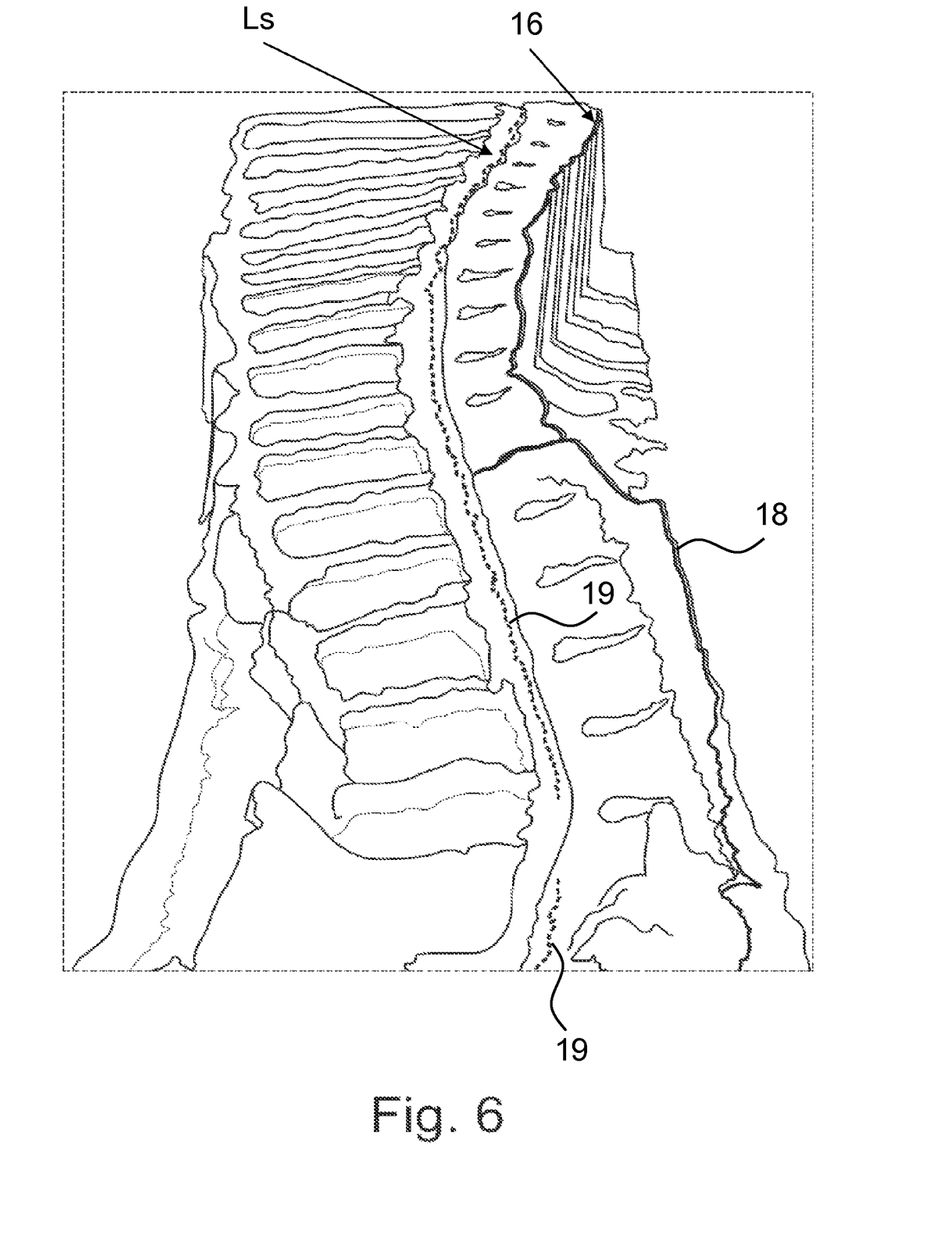
FIG. 6 is a digitally processed image of a the outer surface of a middle of a half pork carcass.

The spinal column (4) is found using a three-step algorithm, the result of which is shown in FIG. 6. First, the rib-facing edge (16) of the spinal column (4) near the rib (6) (the inside of the pig) is found. This step is facilitated by the height difference near the edge (16). The edge (16) is found in a difference image, i.e. an image wherein each point is subtracted from the next point (horizontal in the image). The difference image is then searched vertically form that continuous path, which has the highest edge strength. This is illustrated by the black line (18) to the right in the image of FIG. 6. The edge path is then used to generate a cut-out of the original image. The resulting image only contains that part of the image, which contains the spinal column (4). In the cut-out image, a further difference image procedure is conducted, and the largest edge in this image represents the spinal column (4), as illustrated by the bolded line (19) in the middle-right section of the picture in FIG. 6. As a last step, the found paths are smoothed by approximating a spline curve to the data.

Figure 7:
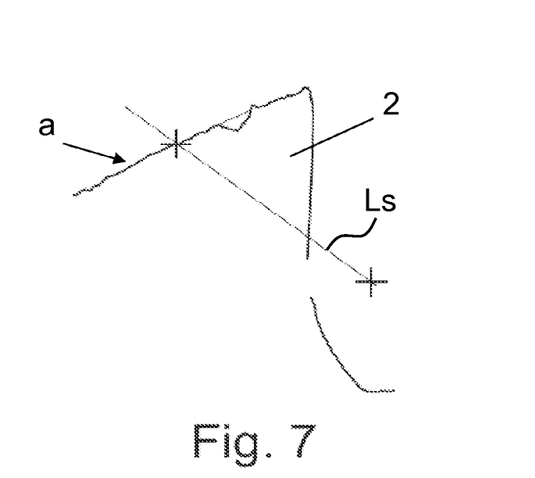
FIG. 7 illustrates a transverse cross-section through a middle of a half pork carcass and a cutting line for the separation of the spinal column as determined on the basis of digital image processing.

FIG. 7 shows a cross section of the middle (1). The cross on the spinal column surface (a) shows the position, at which the cutting device (14), e.g. circular saw, must enter. To find this point, a line is approximated to the surface. Next, the entry point is found at a distance (d) with respect to the position of the spinal column (4) on this line (see FIG. 5). The inclination angle of the cut is used to find the direction of the cut. Finally, the depth of the cutting device (14) is to be determined. In practice, it is desirable that the saw should cut as close to the spinal column (4) as possible.

Figure 8:
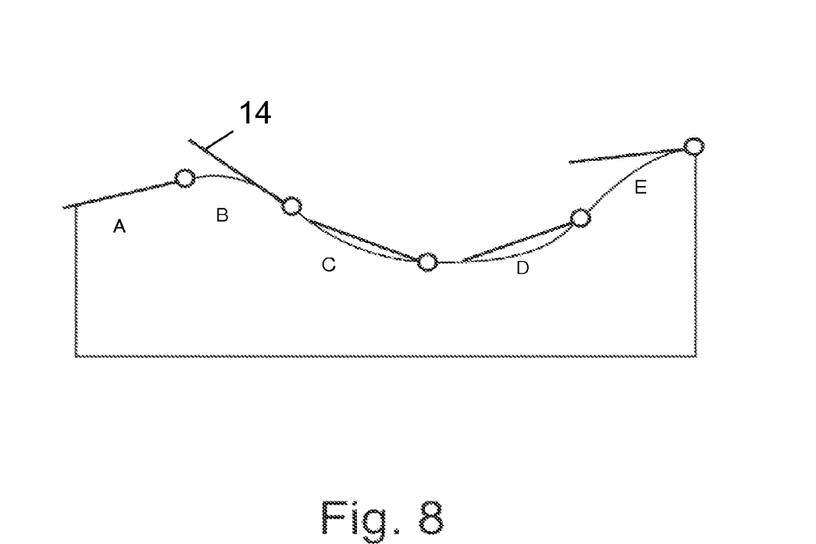
FIG. 8 illustrates positions of a circular saw in a longitudinal cross section of a middle of a half pork carcass.

FIG. 8 shows a longitudinal cross section through a the middle (1) of a half carcass. The circular saw (14) moves from left to right in the cross section. Various positions of the saw (A-E) are shown in FIG. 8. As illustrated, the saw has different yaw angles at the various positions, i.e. the saw blade has different orientations and forms different angles with respect to the underlying surface supporting the meat. Positions A, C and D show that there is a limit for the backmost point of the saw, i.e. of its rearward-facing edge. This point must not go into the meat in order to avoid damage to the meat. Accordingly, the saw (14) is lifted slightly to avoid such damage by controlling the yaw of the saw. It will be appreciated that such control is rendered possible thanks to the knowledge of the surface scan of the middle and of the geometry of the cutting device.

The invention claimed is:

1. A method of separating the spinal column from a carcass middle part, comprising the steps of:
   determining a cutting path ($1_c$) for a cutting device for the separation of the spinal column from the carcass middle part;
   separating the spinal column from the carcass middle part by causing a relative movement between the middle and the cutting device and simultaneosly causing the cutting device to engage the carcass middle wherein;
   optically scanning the middle to provide a scan of an outer surface of the carcass middle part;
   identifying the vertebral canal of the spinal column in the scan on the basis of digital porcessing thereof;
   determining the relative position of the cutting path ($1_c$) with respect to the carcass middle part on the basis of the position of the vertebral canal in said scan; and
   controlling the relative movement between the middle part and the cutting device during the spinal column separation to achieve a cut along the predetermined cutting path ($1_c$),
   wherein at least the steps of optically scanning and identifying the vertebral canal occur prior to the step of causing the cutting device to engage the carcass middle.

2. The method according to claim 1, wherein the cutting path ($1_c$) is non-linear when seen along a longitudinal view.

3. The method according to claim 1, wherein the carcass middle is supported by a supporting surface during separation of the spinal column there from, and wherein at least a portion of the carcass middle is allowed to move relative to the supporting surface, while the cutting device engages it to separate the spinal column there from.

4. The method according to claim 1, wherein the spinal column is separated from the carcass middle part by a single cut.

5. The method according to claim 1, wherein the cutting device is positionable to separate the spinal column from left and right carcass middles, and wherein the method comprises the steps of:
   digitally processing the scan to determine if the carcass middle part is a left or a right half-carcass prior to separating the spinal column there from, and
   passing a control signal for the control of the cutting device, on the basis of which the cutting device is positioned relative to the carcass part to take into account if it is a left or right half carcass.

6. The method according to claim 5, wherein the digital processing of the scan comprises the steps of determining coordinates of the spinal column to identify a spinal path ($1_c$) at a plurality of distinct transverse cross sections along the length of the carcass middle, and wherein the step of determining the cutting path ($1_c$) for the cutting device comprises the steps of determining, at a plurality of distinct transverse cross sections along the length of the carcass middle:
   a transverse distance (d) between the spinal path and the cutting path ($1_c$) on the spinal column surface (a) of the carcass middle;
   an inclination angle ($\Theta$) between the spinal column surface (a) and the cutting device in a cross sectional plane, which is essentially perpendicular to the cutting path ($1_c$) and/or to the spinal column;
   and wherein the position and orientation of the cutting device is controlled while the cutting device engages the carcass middle, so as to position and orient the cutting device to separate the spinal column from the carcass middle along the desired cutting path ($1_c$) at the desired inclination angle ($\Theta$).

7. The method according to claim 6, wherein a pitch angle of the cutting device is further controlled while it engages the carcass middle, the pitch angle representing that angle, which is defined between the cutting device and the spinal column surface (a) in a longitudinally extending plane, which is essentially parallel to the spinal column.

8. The method according to claim 7, wherein the cutting device comprises a circular saw, and wherein said pitch angle is controlled to avoid that a rearward facing edge of the circular saw engages the carcass middle, while a forward facing edge of the circular saw engages the carcass middle to separate the spinal column therefrom.

9. The method according to claim 7, wherein the motion control of the cutting device relative to the carcass middle or relative to a conveyor supporting the carcass middle comprises six degrees of freedom, and wherein the step of determining the cutting patch ($1_c$) comprises the determination of:
- the position (x,y,z) of a centre of the cutting device at each of a plurality of distinct positions along the length of the carcass middle;
- the inclination angle ($\Theta$) of the cutting device at each of said plurality of distinct positions;
- the pitch angle of the cutting device at each of said plurality of distinct positions; and
- a yaw angle of the cutting device, i.e. an angular position of the cutting device with respect to an upright axis, at each of said plurality of distinct positions.

10. The method according to claim 5, wherein the spinal column and/or the vertebral canal is identified in the scan by digital processing of a difference image, in which the rib-facing edge of the spinal column section of the carcass middle and/or the spinal column is detected on the basis of height differences.

11. The method according to claim 9, wherein the carcass middle is supported by a conveyor during separation of the spinal column there from, and wherein the conveyor longitudinally conveys the carcass middle past the cutting device during separation of the spinal column.

12. A system for separating the spinal column from a carcass middle part, comprising:
- a cutting device;
- a control system for determining a cutting path ($1_c$) for the cutting device for the separation of the spinal column from the carcass middle part;
- a motion system for causing a relative movement between the middle part and the cutting device while the cutting device to engage the carcass middle wherein;
- an optical image scanner or camera for providing a scan of an outer surface of the carcass middle part;
- a control system for determining, on the basis of digital processing of said scan, a cutting path ($1_c$) for the cutting device for the separation of the spinal column.

13. The system according to claim 12, wherein said cutting device comprises a single circular saw.

* * * * *